US010739795B2

(12) United States Patent
O'Dougherty (10) Patent No.: US 10,739,795 B2
(45) Date of Patent: Aug. 11, 2020

(54) DETERMINISTIC FEEDBACK BLENDER

(71) Applicant: Air Liquide Electronics U.S. LP, Dallas, TX (US)

(72) Inventor: Kevin T. O'Dougherty, Arden Hills, MN (US)

(73) Assignee: Air Liquide Electronics U.S. LP, Dallas, TX (US)

( * ) Notice: Subject to any disclaimer, the term of this patent is extended or adjusted under 35 U.S.C. 154(b) by 0 days.

(21) Appl. No.: 16/293,981

(22) Filed: Mar. 6, 2019

(65) Prior Publication Data

US 2019/0196519 A1  Jun. 27, 2019

Related U.S. Application Data

(63) Continuation of application No. 15/185,658, filed on Jun. 17, 2016, now abandoned.

(51) Int. Cl.
*G05D 11/13* (2006.01)

(52) U.S. Cl.
CPC ................ *G05D 11/138* (2013.01)

(58) Field of Classification Search
CPC .................................. G05D 11/138
See application file for complete search history.

(56) References Cited

U.S. PATENT DOCUMENTS

| | | |
|---|---|---|
| 1,522,120 A | 6/1925 | Halder |
| 2,152,956 A | 4/1939 | Rudolf |
| 2,513,562 A | 7/1950 | Holuba |
| 2,673,785 A | 3/1954 | Hall |
| 2,979,066 A | 4/1961 | Christie |
| 3,109,631 A | 11/1963 | Purjahn |
| 3,248,233 A | 4/1966 | Allen |
| 3,315,879 A | 4/1967 | Jennings |
| 3,366,061 A | 1/1968 | Adams |
| 3,402,729 A | 9/1968 | Richmond et al. |
| 3,642,384 A | 2/1972 | Huse |
| 3,661,364 A | 5/1972 | Lage |
| 3,877,682 A | 4/1975 | Moss |
| 3,897,935 A | 8/1975 | Forster et al. |
| 3,954,567 A | 5/1976 | Fischer et al. |
| 4,132,585 A | 1/1979 | Oxford |

(Continued)

FOREIGN PATENT DOCUMENTS

| | | |
|---|---|---|
| DE | 102 14 331 | 10/2003 |
| EP | 0 870 353 | 10/1998 |

(Continued)

OTHER PUBLICATIONS

Bannwarth, H. "Fluessigkeitsring-Vakuumpumpen und -Kompressoren im system", Industriepumpen + Kompressoren , Vulkan Verlag, Essen, Germany, vol. 8, No. 4, Nov. 2002, pp. 192-197.

(Continued)

*Primary Examiner* — Tony G Soohoo
(74) *Attorney, Agent, or Firm* — Allen E. White (57) ABSTRACT

Methods and systems for high precision, continuous blending of mixtures, and particularly mixtures having at least two distinct chemical components, are disclosed. More particularly, the disclosed methods and systems provide high precision, continuous blending of buffered oxide etch mixtures containing water, ammonium fluoride, and hydrofluoric acid.

12 Claims, 6 Drawing Sheets

(56) References Cited

U.S. PATENT DOCUMENTS

| | | |
|---|---|---|
| 4,251,627 A | 2/1981 | Calamur |
| 4,299,501 A | 11/1981 | Patil et al. |
| 4,315,717 A | 2/1982 | King |
| 4,359,313 A | 11/1982 | Bernard |
| 4,388,864 A | 6/1983 | Warner |
| 4,398,996 A | 8/1983 | Bolton et al. |
| 4,403,866 A | 9/1983 | Falcoff et al. |
| 4,405,656 A | 9/1983 | Shimizu et al. |
| 4,580,720 A | 4/1986 | Strop et al. |
| 4,621,927 A | 11/1986 | Hiroi |
| 4,655,688 A | 4/1987 | Bohn et al. |
| 4,657,487 A | 4/1987 | Schoenwald et al. |
| 4,712,921 A | 12/1987 | Sugiura |
| 4,776,977 A | 10/1988 | Taylor |
| 4,823,987 A | 4/1989 | Switall |
| 4,844,620 A | 7/1989 | Lissant et al. |
| 4,964,732 A | 10/1990 | Cadeo et al. |
| 4,971,660 A | 11/1990 | Rivers |
| 5,127,926 A | 7/1992 | Baker et al. |
| 5,157,332 A | 10/1992 | Reese |
| 5,308,160 A | 5/1994 | Weiss |
| 5,348,390 A | 9/1994 | Schertenleib |
| 5,372,421 A | 12/1994 | Pardikes |
| 5,407,526 A | 4/1995 | Danielson et al. |
| 5,409,310 A | 4/1995 | Owczarz |
| 5,469,705 A | 11/1995 | Glenn, Jr. |
| 5,522,660 A | 6/1996 | O'Dougherty et al. |
| 5,622,682 A | 4/1997 | Tom |
| 5,688,401 A | 11/1997 | Bober et al. |
| 5,722,441 A * | 3/1998 | Teramoto .......... B08B 3/10 134/56 R |
| 5,722,442 A | 3/1998 | Hoffman et al. |
| 5,723,517 A | 3/1998 | Ocampo et al. |
| 5,755,934 A | 5/1998 | Hoffman et al. |
| 5,785,820 A | 7/1998 | Hoffman et al. |
| 5,800,056 A | 9/1998 | Suzuki et al. |
| 5,846,387 A | 12/1998 | Hoffman et al. |
| 5,865,537 A | 2/1999 | Streiff et al. |
| 5,874,049 A | 2/1999 | Ferri, Jr. et al. |
| 5,924,794 A | 7/1999 | O'Dougherty et al. |
| RE36,290 E | 9/1999 | Clark et al. |
| 5,950,675 A | 9/1999 | Minami et al. |
| 5,951,779 A | 9/1999 | Koyanagi et al. |
| 5,980,836 A | 11/1999 | Moffett et al. |
| 5,990,014 A | 11/1999 | Wilson et al. |
| 6,050,283 A | 4/2000 | Hoffman et al. |
| 6,065,864 A | 5/2000 | Evans et al. |
| 6,113,769 A | 9/2000 | Uzoh et al. |
| 6,120,175 A | 9/2000 | Tewell |
| 6,146,008 A | 11/2000 | Laederich et al. |
| 6,153,014 A | 11/2000 | Song |
| 6,183,720 B1 | 2/2001 | Laederich et al. |
| 6,224,778 B1 | 5/2001 | Peltzer |
| 6,227,222 B1 | 5/2001 | Jennings |
| 6,247,838 B1 | 6/2001 | Pozniak et al. |
| 6,286,526 B1 | 9/2001 | Hase et al. |
| 6,290,384 B1 | 9/2001 | Pozniak et al. |
| 6,463,941 B1 | 10/2002 | Takita |
| 6,464,799 B1 | 10/2002 | Lerner et al. |
| 6,623,183 B2 | 9/2003 | Nakagawa et al. |
| 6,764,212 B1 | 7/2004 | Nitta et al. |
| 6,766,818 B2 | 7/2004 | Kashkoush et al. |
| 6,799,883 B1 * | 10/2004 | Urquhart .......... B01F 15/00227 137/3 |
| 6,923,568 B2 | 8/2005 | Wilmer et al. |
| 7,153,690 B2 * | 12/2006 | Stevens .......... G05D 11/138 436/51 |
| 7,344,297 B2 | 3/2008 | Urquhart |
| 7,743,783 B2 | 6/2010 | Edwards |
| 7,871,249 B2 | 1/2011 | Urquhart et al. |
| 7,980,753 B2 | 7/2011 | Urquhart et al. |
| 8,235,580 B2 * | 8/2012 | Fanjat .......... G05D 11/133 134/10 |
| 8,591,095 B2 * | 11/2013 | Fanjat .......... G05D 11/133 366/132 |
| 2001/0047812 A1 | 12/2001 | Bryer et al. |
| 2002/0048213 A1 | 4/2002 | Wilmer et al. |
| 2002/0124869 A1 | 9/2002 | Chiu |
| 2002/0136087 A1 | 9/2002 | Nakagawa et al. |
| 2002/0144727 A1 | 10/2002 | Kashkoush et al. |
| 2002/0148485 A1 | 10/2002 | Taft et al. |
| 2002/0174804 A1 | 11/2002 | Rodrigues et al. |
| 2004/0052154 A1 | 3/2004 | Hiraoka et al. |
| 2004/0057334 A1 | 3/2004 | Wilmer et al. |
| 2004/0125688 A1 | 7/2004 | Kelley et al. |
| 2004/0144164 A1 | 7/2004 | Bergman |
| 2004/0148485 A1 | 7/2004 | Suzuki |
| 2005/0084979 A1 | 4/2005 | Dulphy et al. |
| 2007/0108113 A1 | 5/2007 | Urquhart et al. |
| 2007/0109912 A1 | 5/2007 | Urquhart et al. |
| 2007/0119816 A1 | 5/2007 | Urquhart et al. |
| 2009/0090164 A1 | 4/2009 | Inman |
| 2009/0141583 A1 * | 6/2009 | Fanjat .......... G05D 11/133 366/140 |
| 2009/0151419 A1 | 6/2009 | Doniat et al. |
| 2012/0300573 A1 | 11/2012 | Urquhart |
| 2013/0028043 A1 * | 1/2013 | Fanjat .......... G05D 11/133 366/152.4 |
| 2016/0296902 A1 * | 10/2016 | O'Dougherty .......... G05D 11/138 |
| 2019/0196519 A1 * | 6/2019 | O'Dougherty .......... G05D 11/138 |

FOREIGN PATENT DOCUMENTS

| | | |
|---|---|---|
| EP | 0 870 729 | 10/1998 |
| JP | S57 200695 | 12/1982 |
| JP | H06 252122 | 9/1994 |
| JP | H08 108054 | 4/1996 |
| JP | 2002 301351 | 10/2002 |
| JP | 2 833 365 | 6/2003 |
| JP | 2003 200031 | 7/2003 |
| WO | WO 96 39263 | 12/1996 |
| WO | WO 96 39266 | 12/1996 |
| WO | WO 96 39358 | 12/1996 |
| WO | WO 96 39651 | 12/1996 |
| WO | WO 99 53121 | 10/1999 |
| WO | WO 03 043059 | 5/2003 |
| WO | WO 2006 010121 | 1/2006 |
| WO | WO 2006 109144 | 10/2006 |

OTHER PUBLICATIONS

International Search Report for related PCT/US95/07649, dated Feb. 16, 1996.

International Search Report for related PCT/US96/10389, dated Aug. 26, 1996.

European Search Report for related EP 00 40 3566, dated Jun. 3, 2003.

International Search Report and Written Opinion for related PCT/IB2006/000852, dated Aug. 23, 2006.

Search Report and Written Opinion for related SG 200716910-5, dated Aug. 13, 2009.

International Search Report and Written Opinion for related PCT/IB2006/002618, dated Jan. 26, 2007.

Search Report and Written Opinion for related SG 200802195-8, dated Mar. 4, 2009.

International Search Report and Written Opinion for related PCT/IB2007/001245, dated Oct. 11, 2007.

International Search Report and Written Opinion for related PCT/IB2007/001250, dated Oct. 26, 2007.

International Search Report and Written Opinion for related PCT/IB2007/001267, dated Nov. 15, 2007.

International Search Report and Written Opinion for related PCT/IB2007/001262, dated Oct. 18, 2007.

\* cited by examiner

FIG 3 Offline Analysis and Feedforward

DETERMINISTIC FEEDBACK BLENDER

CROSS REFERENCE TO RELATED APPLICATIONS

This application is a continuation of U.S. patent application Ser. No. 15/185,658 filed Jun. 17, 2016, the entire contents of which are incorporated herein by reference.

TECHNICAL FIELD

Methods and systems for high precision, continuous blending of mixtures, and particularly mixtures having at least two distinct chemical compounds, are disclosed. More particularly, the disclosed methods and systems provide high precision, inline blending of, among others, buffered oxide etch mixtures containing water, ammonium fluoride, and hydrofluoric acid.

BACKGROUND

In various industries, chemical delivery systems are used to supply chemicals to processing tools. Illustrative industries include the semiconductor, pharmaceutical, biomedical, food processing, household product, personal care product, or petroleum industries.

The chemicals being delivered by a given chemical delivery system depend, of course, on the particular processes being performed. Accordingly, the particular chemicals supplied to a semiconductor processing tool depend upon the processes being performed inside the tool. Illustrative semiconductor processes include etching, cleaning, chemical mechanical polishing (CMP), and wet deposition (e.g., spin-on, copper electroless, electroplating, etc.).

Commonly, two or more fluids are combined to form the desired mixture for the particular process. The mixtures may be prepared in batches, on- or off-site, and then shipped to the processing location. Alternatively, the mixtures may be prepared at the point-of-use using a suitable blender system.

U.S. Pat. No. 6,050,283 to Air Liquide America Corp. discloses a system and method for mixing and/or diluting ultrapure fluids, such as liquid acids, for semiconductor processing.

U.S. Pat. No. 6,799,883 to Air Liquide America L.P discloses a method and apparatus for continuously blending a chemical solution for use in semiconductor processing.

U.S. Pat. No. 6,923,568 to Celerity, Inc. discloses a method and apparatus for blending and supplying process materials, particularly ultra-high purity chemicals.

U.S. Pat. No. 7,344,297 to Air Liquide Electronics U.S., LP, discloses a method and apparatus for asynchronous blending and supply of chemical solutions.

A need remains for methods and systems for high precision, continuous blending of solutions.

NOTATION AND NOMENCLATURE

Certain abbreviations, symbols, and terms are used throughout the following description and claims, and include:

As used herein, the indefinite article "a" or "an" means one or more.

As used herein, the terms "approximately" or "about" mean±2% of the value stated.

As used herein, the term "inline" or "continuous" means that the blending process substantially simultaneously feeds the chemicals to while removing the product mixture from a mixing zone without interruption. The inline blending process is distinct from a "batch" process, in which defined quantities of chemicals are mixed, typically in a mixing tank, to produce a batch, or specific quantity, of the product mixture.

As used herein, the term "slurry" means a chemically active or buffered solution containing suspended solids. Slurries are typically used to remove and/or planarize deposited materials.

As used herein, the term "species" means atoms, molecules, molecular fragments, ions, etc. resulting from the methods disclosed. In other words, the disclosed blending methods of any of the components, fluids, acids, bases, oxidizers, reducers, or chemicals disclosed herein may produce species (i.e., atoms, molecules, molecular fragments, ions, etc.) of the item subject to blending.

As used herein, the phrase "maintaining a target concentration in the mixture of Component X within # % w/w" means not permitting the concentration of the mixture to exceed the # % w/w difference from the target concentration.

SUMMARY

Inline blending methods are disclosed. The components that are blended may alter each other's assays, complicating the standard inline blending processes which typically mix components based on volume or mass. Component A, Component B, and a solvent are mixed in an inline blender to form a mixture. The mixture is analyzed downstream of the inline blender to determine the concentration of Component A and the concentration of Component B. A target concentration in the mixture of Component A is maintained within 0.008% w/w and a target concentration in the mixture of Component B is maintained within 0.22% w/w by adjusting the flow rate of Component A, Component B, and/or the solvent based on the concentration of Component A and the concentration of Component B. The disclosed inline blending methods may include one or more of the following aspects:

- maintaining the target concentration notwithstanding the source of Component A and/or Component B and/or the solvent;
- the mixture being a solution;
- the mixture being a slurry;
- the slurry comprising a basic solution;
- the slurry comprising an acidic solution;
- the slurry comprising abrasive particles;
- the abrasive particles being silica ($SiO_2$), alumina ($Al_2O_3$), calcium carbonate ($CaCO_3$), ceria ($CeO_2$), zirconia ($ZrO_2$), or titania (TiO2);
- the solvent being ultra pure water;
- the inline blender being a static mixer;
- the inline blender being a stirrer;
- the inline blender being a vortex element;
- the inline blender being a combination of a static mixer and a vortex element;
- downstream of the inline blender being a tube or pipe having an unrestricted flow path;
- downstream of the inline blender not being a mixing or holding tank;
- wherein Component A, Component B, and the solvent are mixed together in one inline blender to form the mixture;
- wherein Component A, Component B, the solvent, and the abrasive particles are mixed together in one inline blender to form the mixture;

maintaining the target concentration of Component A within 0.001% w/w;

maintaining the target concentration of Component B within 0.001% w/w;

Component A comprising species that affect the concentration of Component B;

Component B comprising species that affect the concentration of Component A;

the flow rate of Component A, Component B, and/or the solvent being adjusted using a PID algorithm;

Component A being HF and Component B being $NH_4F$;

Component A being a slurry and Component B being $H_2O_2$

Component A being $NH_4OH$ and Component B being $H_2O_2$;

Component A being HCl and Component B being $H_2O_2$;

Component A being $H_2SO_4$ and Component B being $H_2O_2$;

Component A being $NH_4OH$ and Component B being ammonium acetate;

Component A being $NaHCO_3$ and Component B being NaOH;

analyzing the concentration of Component A using a different analyzer than that used to measure the concentration of Component B;

the concentration of Component A and the concentration of Component B being monitored by a combination of a conductivity meter, a pH meter, a refractometer, a turbidity monitor, a Raman spectrometer, an infrared spectrometer, a UV/VIS spectrometer, a densitometer, an ultra-sonic meter, and a particle counter;

the concentration of HF being determined using a pH meter;

the concentration of the slurry being determined by a densitometer;

the concentration of $H_2O_2$ being determined by a refractometer;

the concentration of HCl being determined using a pH meter;

the concentration of HF being determined using a conductivity meter;

the concentration of HCl being determined using a conductivity meter;

the concentration of $H_2SO_4$ being determined using a conductivity meter;

the concentration of $NH_4F$ being determined using a conductivity meter;

the concentration of $NH_4OH$ being determined using a conductivity meter;

the concentration of $H_2O_2$ being determined using a refractometer;

adjusting the flow rate of Component A using a PID algorithm;

adjusting the flow rate of Component B using a PID algorithm;

the flow rate of HF being adjusted using a direct acting PID algorithm; and the flow rate of $NH_4F$ being adjusting using a reverse acting PID algorithm.

Methods of mixing chemical fluids in an inline blender to produce a mixture having a concentration of the chemical fluids within 0.22% w/w of a target concentration are also disclosed. A first chemical fluid is introduced into an inline blender via a first flow control device. A second chemical fluid is introduced into the inline blender via a second flow control device. A third chemical fluid is introduced into the inline blender via a third flow control device. The first chemical fluid, the second chemical fluid, and the third chemical fluid are mixed in a mixing zone of the inline blender to form a mixture. The mixture is monitored downstream from the mixing zone for a first chemical fluid concentration and a second chemical fluid concentration. The first flow control device is adjusted based on the first chemical fluid concentration. The second flow control device is adjusted based on the second chemical fluid concentration. The disclosed methods may include one or more of the following aspects:

maintaining the target concentration notwithstanding the source of the first chemical fluid and/or the second chemical fluid and/or the third chemical fluid;

the first flow control device, the second flow control device, and the third flow control device being an orifice, a flow control valve, a stepper throttle, or combinations thereof;

the mixing zone being a tube or a pipe having an unrestricted flow path;

the mixing zone comprising an element to induce mixing;

the element to induce mixing being a static mixer, a stirrer, a vortex element, or combinations thereof;

downstream of the inline blender being a tube or pipe having an unrestricted flow path;

downstream of the inline blender not being a mixing or holding tank;

the mixture being a solution;

the mixture being a slurry;

the slurry comprising a basic solution;

the slurry comprising an acidic solution;

the slurry comprising abrasive particles;

the abrasive particles being silica ($SiO_2$), alumina ($Al_2O_3$), calcium carbonate ($CaCO_3$), ceria ($CeO_2$), zirconia ($ZrO_2$), or titania (TiO2);

wherein the first chemical fluid, the second chemical fluid, and the third chemical fluid are mixed together in one mixing zone of the inline blender to form the mixture;

maintaining the target concentration of the first chemical fluid within 0.008% w/w;

maintaining the target concentration of the second chemical fluid within 0.22% w/w;

the first chemical fluid and the second chemical fluid not being water;

the first chemical fluid being $H_2SO_4$, HF, $NH_4OH$, or HCl;

the second chemical fluid being $H_2O_2$ or $NH_4F$;

the third chemical fluid being water;

the first chemical fluid being HF and the second chemical fluid being $NH_4F$;

the first chemical fluid being $NH_4OH$ and the second chemical fluid being $H_2O_2$;

the first chemical fluid being HCl and the second chemical fluid being $H_2O_2$;

the first chemical fluid being $H_2SO_4$ and the second chemical fluid being $H_2O_2$;

the first chemical fluid being $NH_4OH$ and the second chemical fluid being ammonium acetate;

the first chemical fluid being $NaHCO_3$ and the second chemical fluid being NaOH;

the first chemical fluid comprising ions that affect the second chemical fluid concentration;

the second chemical fluid comprising ions that affect the first chemical fluid concentration;

the ions being selected from $H^+$, $NH_4^+$, $SO_4^{2-}$, $F^-$, $OH^-$, or $Cl^-$;

the ions being selected from $H^+$, $NH_4^+$, $H^-$, $OH^-$, $OOH^-$, $O_2^-1$, or $F^-$;

analyzing the concentration of the first chemical fluid using a different analyzer than that used to measure the concentration of second chemical fluid;
the first chemical fluid concentration and the second chemical fluid concentration being monitored by a combination of a conductivity meter, a pH meter, a refractometer, a turbidity monitor, a Raman spectrometer, an infrared spectrometer, a UV/VIS spectrometer, a densitometer, an ultra-sonic meter and a particle counter;
the first chemical fluid concentration being monitored by a temperature-adjusted conductivity meter;
the second chemical fluid concentration being monitored by a temperature-adjusted pH meter;
the concentration of HF being determined using a pH meter;
the concentration of slurry being determined by a densitometer;
the concentration of $H_2O_2$ being determined by a refractometer;
the concentration of HCl being determined using a pH meter;
the concentration of HF being determined using a conductivity meter;
the concentration of HCl being determined using a conductivity meter;
the concentration of $H_2SO_4$ being determined using a conductivity meter;
the concentration of $NH_4F$ being determined using a conductivity meter;
the concentration of $NH_4OH$ being determined using a conductivity meter;
the flow rate of $H_2O_2$ being adjusted using a refractometer;
adjusting the flow rate of the first chemical fluid using a PID algorithm;
adjusting the flow rate of second chemical fluid using a PID algorithm;
the flow rate of HF being adjusted using a direct acting PID algorithm; and
the flow rate of $NH_4F$ being adjusting using a reverse acting PID algorithm.

Methods of mixing acids and bases in an inline blender to produce mixtures having consistent concentrations are also disclosed. A solvent is introduced into an inline blender via a first flow control device. An acid is introduced into the inline blender via a second flow control device. A base is introduced into the inline blender via a third flow control device. The acid, base, and solvent are mixed in a mixing zone of the inline blender to form a mixture. The mixture is monitored downstream from the mixing zone for an acid concentration and a base concentration. The second flow control device is adjusted based on the acid concentration. The third flow control device is adjusted based on the base concentration. The disclosed methods include one or more of the following aspects:

maintaining the acid concentration and the base concentration notwithstanding the source of the acid and/or the base;
the first flow control device, the second flow control device, and the third flow control device being an orifice, a flow control valve, a stepper throttle, or combinations thereof;
wherein the acid, base, and solvent are mixed together in one mixing zone of the inline blender to form the mixture;
the mixing zone being a tube or a pipe having an unrestricted flow path;
the mixing zone comprising an element to induce mixing;
the element to induce mixing being a static mixer, a stirrer, a vortex element, or combinations thereof;
downstream of the mixing zone being a tube or pipe having an unrestricted flow path;
downstream of the mixing zone not being a mixing or holding tank;
the mixture being a solution;
monitoring the acid concentration using a different analyzer than that used to measure the base concentration;
the acid concentration and base concentration being monitored by a combination of a conductivity meter, a pH meter, a refractometer, a turbidity monitor, a Raman spectrometer, an infrared spectrometer, a UV/VIS spectrometer, a densitometer, an ultra-sonic meter and a particle counter;
maintaining the target concentration of the acid within 0.01% w/w;
maintaining the target concentration of the base within 0.01% w/w;
maintaining the target concentration of the acid within 0.001% w/w;
maintaining the target concentration of the base within 0.001% w/w;
the solvent being water;
the acid and the base not being water;
the acid comprising ions that affect the base concentration;
the acid being HF;
the ions being selected from the group consisting of $H^{3O}$ and $F^-$;
the base comprising ions that affect the acid concentration;
the base being $NH_4F$;
the ions being selected from the group consisting of $H^+$, $NH_4^+$, $H^-$, or $F^-$;
the base concentration being monitored by a temperature-compensated conductivity meter; and
the acid concentration being monitored by a temperature-compensated pH meter.

Methods of mixing an oxidizer and a reducer in an inline blender to produce a mixture having a consistent concentration are also disclosed. A solvent is introduced into an inline blender via a first flow control device. An oxidizer is introduced into the inline blender via a second flow control device. A reducer is introduced into the inline blender via a third flow control device. The oxidizer, reducer, and solvent are mixed in a mixing zone of the inline blender to form a mixture. The mixture is monitored downstream from the mixing zone for an oxidizer concentration and a reducer concentration. The second flow control device is adjusted based on the oxidizer concentration. The third flow control device is adjusted based on the reducer concentration. The disclosed methods may include one or more of the following aspects:

maintaining the oxidizer concentration and the reduce concentration notwithstanding the source of oxidizer and/or the reducer;
the first flow control device, the second flow control device, and the third flow control device being an orifice, a flow control valve, a stepper throttle, or combinations thereof;
wherein the oxidizer, reducer, and solvent are mixed together in one mixing zone of the inline blender to form the mixture;

the mixing zone being a tube or a pipe having an unrestricted flow path;
the mixing zone comprising an element to induce mixing;
the element to induce mixing being a static mixer, a stirrer, a vortex element, or combinations thereof;
downstream of the mixing zone being a tube or pipe having an unrestricted flow path;
downstream of the mixing zone not being a mixing or holding tank;
the mixture being a solution;
monitoring the oxidizer concentration using a different analyzer than that used to measure the reducer concentration;
the oxidizer concentration and reducer concentration being monitored by a combination of a conductivity meter, a pH meter, a refractometer, a turbidity monitor, a Raman spectrometer, an infrared spectrometer, a UV/VIS spectrometer, a densitometer, an ultra-sonic meter and a particle counter; maintaining the target concentration of the oxidizer within 0.01% w/w;
maintaining the target concentration of the reducer within 0.01% w/w;
maintaining the target concentration of the oxidizer within 0.001% w/w;
maintaining the target concentration of the reducer within 0.001% w/w;
the solvent being water;
the oxidizer and the reducer not being water;
the oxidizer comprising ions that affect the reducer concentration;
the oxidizer being $H_2O_2$ or $NH_4OH$;
the ions being $H^+$, $NH_4^+$, or $OH^-$;
the reducer comprising ions that affect the oxidizer concentration;
the reducer being $H_2O_2$, $H_2SO_4$, or HCl;
the ions being $H^+$, $H^-$, $OH^-$, $OOH^{31}$, $O^{2-}$, $HSO4^{2-}$, $SO_4^{2-}$, or $Cl^-$;
monitoring the reducer concentration by a temperature-compensated conductivity meter; and
monitoring the oxidizer concentration by a temperature-compensated pH meter.

An inline chemical blender for mixing chemicals in real-time is also disclosed. Three chemical fluid flow control devices communicate three chemical fluids from their sources to a mixing zone of the inline chemical blender. Three sensors are located downstream of the mixing zone, one of which monitors the temperature of the mixture and two of which measure the concentrations of two of the chemical fluids in the mixture. The disclosed inline chemical blender may include one or more of the following aspects:
each flow control device being an orifice, flow control valve, stepper throttle, or combinations thereof;
the mixing zone being a tube or pipe;
the mixing zone being a tank or reservoir;
downstream of the mixing zone being a tube or pipe having an unrestricted flow path;
downstream of the mixing zone not being a mixing or holding tank;
measuring the concentration of a first chemical fluid using a different sensor than that used to measure the concentration of a second chemical fluid;
maintaining a concentration of the first chemical fluid in the mixture and a concentration of the second chemical fluid in the mixture notwithstanding the source of the first chemical fluid and/or the second chemical fluid;
the sensors being combinations of a temperature sensor, a conductivity meter, a pH meter, a refractometer, a turbidity monitor, a Raman spectrometer, an infrared spectrometer, a UV/VIS spectrometer, a densitometer, an ultra-sonic meter and a particle counter;
the sensors communicating with the flow control devices via a PID algorithm;
the PID algorithm adjusting the flow rate of a chemical fluid proportionally to the pH results of the chemical fluid;
the PID algorithm increasing the flow rate of a chemical fluid when the pH results of the chemical fluid increase;
the PID algorithm adjusting the flow rate of a chemical fluid inversely to the conductivity results of the chemical fluid;
the PID algorithm decreasing the flow rate of a chemical fluid when the conductivity results of the chemical fluid increase; and
further comprising a drain downstream of the mixing zone.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Inline blending multiple chemical constituents in a way that is accurate and repeatable is difficult when the chemical constituents interact with and affect each other. Even if the assay of each chemical constituent consistently remains within a specification window, the effect of compounding error may make it difficult to control the specification for the final blended product.

The prior art volume-based and weight-based blending processes do not address this issue, since they depend solely on the known specification of the incoming material.

Metrology-based feedback inline blenders use techniques such as conductivity, pH, refractive index, density, turbidity, and other measurements, in order to control the flow rate of the chemicals and maintain the final blended material specification.

Figure 1:
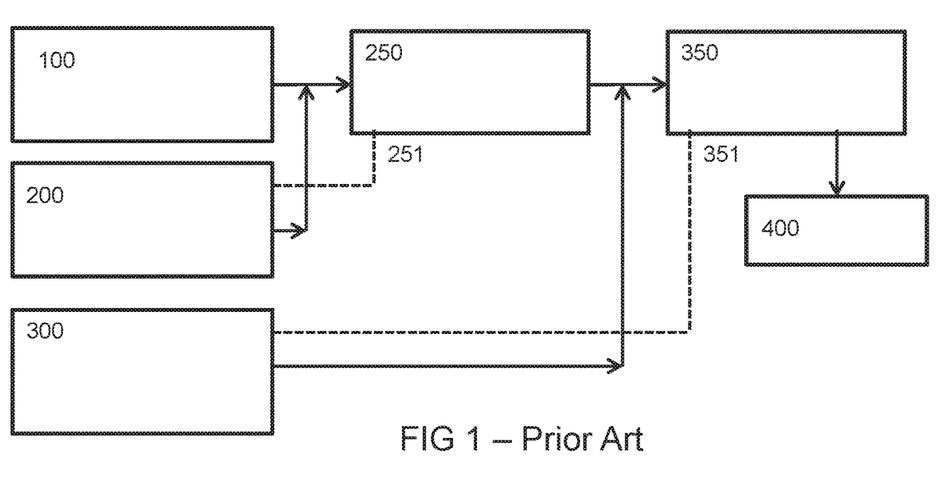
FIG. 1 is a block schematic diagram of a prior art inline blender.

Previous continuous inline blenders, of the type schematically represented in FIG. 1, have a series of "Blend Points" with one constituent species added at each blend point and controlled locally with a feedback metrology device, typically conductivity, but also Refractive Index, pH, Ultra Sonic, densitometers, etc. The first complication to final blend accuracy in these series of continuous inline blenders arises at the second blend point. The concentration of the first blend point is immune to the single species source assay, such as 49% HF acid, because the first series blend point with feedback provides for the correct first blend point assay even if the chemical source is 48% HF acid. The feedback from the first blend point allows more flow of the 48% HF source to compensate. However, the second blendpoint is not immune to the single species source assay, even when the second chemical source is a single species, such as $NH_4F$ having no other added species, such as HF or $NH_3$. if the single species $NH_4F$ source assay varies from the expected 40% $NH_4F$ w/w (e.g., 39% or 41% $NH_4F$ w/w), the variance ripples upstream and alters the intended assay of the first blend point by diluting or concentrating it. In other words, the addition of the second chemical having an assay that differs from expected results in an improper concentration of the first chemical in the final solution.

Concentration control is further impacted when the two chemical compounds to be blended alter each other's concentrations. In other words, prior art systems use of subsequent sensors to measure the concentration of each sequentially added component fails to address the impact a subsequent component may have on the concentration of an earlier component. As a result, some solutions cannot be blended without ambiguous output based upon the prior art single component/single sensor embodiment. For example, any traces of $NH_3$ or HF in $NH_4F$ may negatively affect the total HF concentration in a buffered oxide etch solution.

A term used to describe the robustness of a blender for source chemical concentrations is "Source Immunity". This describes the level to which the final inline blend concentration target can be maintained with variations in the concentration of the input source chemicals. Single Species Source Immunity exists only at the first blend point. In other words, the final output of the blending with feedback from a conductivity signal for simple HF dilution blending is immune to the input HF concentration (i.e., 48% wt/wt, 49% wt/wt, 46% wt/wt, etc.).

For each subsequent series blend point (i.e., second, third, etc.), the precise source assay input must be known and constant, or concentration or dilution of the first constituent may take place and result in an out of specification assay condition for the first component at the second and/or third blend points. This type of blend error ripples upstream through the series of continuous inline blenders. The second component may be out of specification at the third and fourth blend points.

This continuous inline blender limitation is worsened when certain species are present in more than one of the chemical constituents being blended. For example, $NH_4F$ may include $H_2O$, $OH^-$, $NH_4F$, $NH_3$, $NH_4^+$, HF, $H^+$, and $F^-$. When HF and $NH_4F$ are blended, any HF or $F^-$ present therein may alter the concentration of HF in the final blend.

In the semiconductor industry, due to the high purity required for the chemicals and blends containing these chemicals, gas phase generation of the chemical or blend is typical and preferable compared to simple solid phase dissolution of various salts etc. As a result, the final assay may also include free species in the gas phase due to difficulty controlling the final gas phase end point.

When multiple chemicals are blended, for example deionized water (DIW)+Chemical A+Chemical B, the prior art teaches that Chemical A is added at a first chemical mixing zone, controlled by a first metrology feedback, and Chemical B is added sequentially into a second chemical mixing zone, controlled by a second metrology feedback. See, e.g., U.S. Pat. No. 6,050,283 to Air Liquide America Corp. Additional chemical additions are possible, each one added in sequence with a dedicated metrology feedback control. When the incoming source material specification changes, the blender described above is not able to detect or correct for that condition for all upstream chemicals, and the blended material may be out of specification.

Accurate mixing of chemicals is particularly important in at least the semiconductor industry due to the continuous shrinking of the product size necessitated by Moore's law. Failure to maintain the specified concentrations may introduce product variations or even failure. Product degradation may occur when the product is shipped from off-site or if a batch sits for too long.

Buffered chemical solutions using salt buffers are particularly afflicted by the limitations of the prior art continuous inline blenders. For example, many buffered oxide etch formulations will use an ammonium fluoride (i.e., $NH_4F$) salt buffer to create a buffered hydrofluoric acid solution for etch control. The original $NH_4F$ solution is manufactured by dissolving $NH_3$ gas into a hydrofluoric acid solution and attempting to stop the manufacturing process at the neutral point (i.e., the point at which there is no excess HF or $NH_3$ in the solution). If the reaction is stopped too early, the final ammonium fluoride becomes HF rich and if the reaction is stopped late, the resulting ammonium fluoride would be $NH_3$ rich. Alternatively, the entire ammonium fluoride salt buffer may be generated from the gas phase by first dissolving anhydrous HF into water to form HF acid and then dissolving $NH_3$ gas into the HF acid to formulate the ammonium fluoride. In this case, if the reaction is stopped too early, the final ammonium fluoride becomes HF rich and if the reaction is stopped late, the resulting ammonium fluoride would be $NH_3$ rich. As a result, the final blend assay is affected by the unknown and non-constant free species in the ammonium fluoride source material.

Preparation of a buffered oxide etch solution is described as follows using a typical prior art blender shown in FIG. 1 in block schematic form. In FIG. 1, Ultrapure Water, or UPW, 100 is blended with 49% w/w HF 200 at blendpoint 250 to produce dilute HF. The UPW 100 may be delivered to blendpoint 250 using a flow meter (not shown). The HF 200 may be delivered to blendpoint 250 using a proportioning valve (not shown). The proportioning valve (not shown) may deliver more or less HF 200 to the blendpoint 250 based on temperature corrected conductivity feedback 251 to achieve the desired dilute HF assay. The dilute HF produced at blendpoint 250 is at the desired concentration independent of the actual HF 200 source assay (i.e., source immunity).

The dilute HF produced at blendpoint 250 is then blended with ammonium fluoride 300, which may contain free $NH_3$ or HF, at blendpoint 350 to produce the buffered oxide etch solution 400. Although depicted as a "block" in FIG. 1, one of ordinary skill in the art will recognize that the buffered oxide etch solution 400 is delivered either directly to the processing equipment or to a drain. The ammonium fluoride 300 may be delivered to blendpoint 350 using a proportioning valve (not shown).

At blendpoint 350, the first general error may arise as a function of the actual ammonium fluoride assay—40.0% +/−1% $NH_4F$ by wt. If this assay is not known and held constant across all sources of ammonium fluoride 300, the HF assay in the buffered oxide etch solution 400 may be forced out of specification. In addition, the final HF concentration may be affected by the unknown and non-constant free species, $NH_3$ or HF, existing in the gas phase production generation of ammonium fluoride source material 300. The final free HF assay in the buffered oxide etch solution 400 typically requires a very high tolerance due to the sensitive process in which the etch solution is used.

As a result, the buffered oxide etch solution 400 only produces acceptable HF assays for one exact and specific assay of the ammonium fluoride source material 300, for example 40.0% $NH_4F$ and 0.05% Free HF by wt. Every time a new lot of ammonium fluoride 300 is brought online or if the ammonium fluoride 300 undergoes any changes in concentration while being used, the blender set points must be changed to produce the required buffered oxide etch solution assays. The ammonium fluoride assay may be performed using titration, functional silicon wafer etch tests, or a combination of both, all of which are time consuming and time sensitive.

The UPW 100, HF 200, and $NH_4F$ 300 are retrieved from industry standard storage units. The storage units are in fluid communication with blendpoint 250 and 350. Blendpoint 250 and 350 are in fluid communication with a drain (not shown) and processing equipment (not shown). More particularly, supply lines supply the UPW 100, HF 200, and $NH_4F$ 300 to the blendpoints 250 and 350. Similarly, supply lines supply the resulting buffered oxide etch solution to a drain (not shown) or processing equipment (not shown). The supply lines are industry standard supply lines. The supply lines may include flow control devices, such as orifices, flow control valves, stepper throttles, or combinations thereof; valves, such as check valves or electronic valves; and/or pressure regulators.

Blendpoint 250 or 350 is a mixing zone, also known as an inline blender. The mixing zone may be a tube or pipe having an unrestricted flow path. Alternatively, the mixing zone may be a T junction. In either alternative, the tube or pipe may include an element to induce mixing, such as a static mixer, a stirrer, a vortex element, or combinations thereof. One of ordinary skill in the art will recognize that the suitable mixing zone will be determined based upon both the mixing conditions required and pressure necessary at the point of use. More particularly, a viscous solution or slurry may require more forceful mixing than a flowing solution and, as a result, an element to induce mixing. However, an element to induce mixing may result in loss of pressure across the system. One of ordinary skill in the art will recognize the mixing zone necessary based on equipment setup and the product to be mixed.

The supply line downstream of blendpoint 250 or 350 includes a sensor (not shown) that measures a characteristic of the blend. Exemplary sensors include conductivity meters, pH meters, refractometers, turbidity monitors, Raman spectrometers, infrared spectrometers, a densitometer, an ultra-sonic meter, spectrometers, and particle counters. The sensors provide real-time feedback (i.e., 251, 351) to the relevant flow control device and adjusts the flow rate based on the analysis results. For example, if the conductivity is a little high, a conductivity meter may instruct the flow control device for HF 100 to decrease the flow rate. If the conductivity is too high so that the resulting buffered oxide etch solution 400 is unusable, the sensor may instruct a valve in the line to divert the solution to the drain. The sensors and flow control devices may communicate via a controller. The communication may occur via electrical wiring or wireless communication links. The controller may include a processor that is programmable to implement any one or more suitable types of process control, such as proportional-integral-derivative (PID) feedback control. Exemplary controllers include the PLC Simatic S7-300 system from Siemens Corp. Also commonly used are Allen Bradley CompactLogix PLC Control and the Allen Bradley RSLogix programming suite.

Surprisingly, Applicants have found that neither the refractometer nor the conductivity meter were capable of determining the concentration of free species in the resulting buffered oxide etch solution. However, pH analysis properly reflects free species in the solution.

Figure 2:
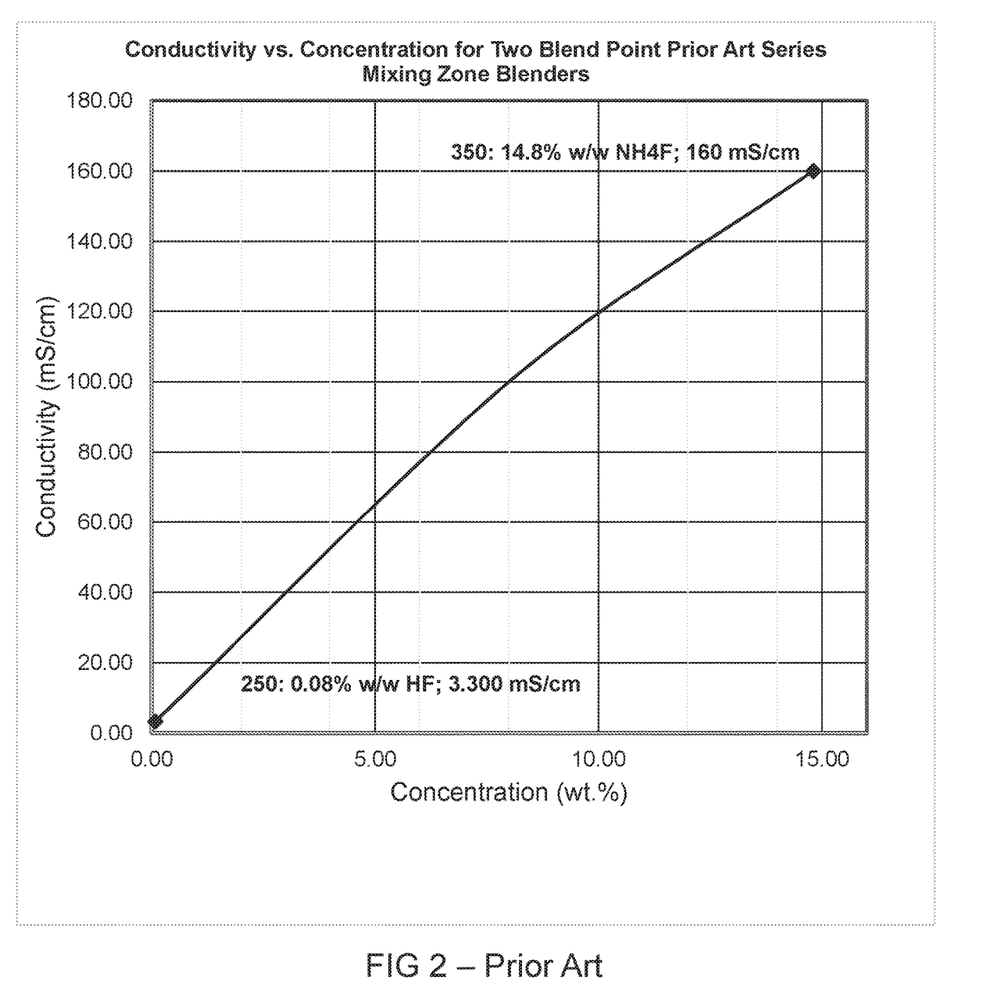
FIG. 2 is a graph showing concentration (wt. %) versus conductivity (mS/cm) of two blend points produced by the prior art inline blender of FIG. 1.

FIG. 2 is a graph that illustrates the resulting two blend point operating curve that demonstrates the inadequacy of the prior art inline blender of FIG. 1. The graph shows the conductivity (in mS/cm) versus concentration (in wt. %) of two blend points: 250 and 350. Point 250 provides the concentration and conductivity of the solution at blendpoint 250 in FIG. 1, more particularly, 0.08% w/w HF and 3.300 mS/cm. Point 350 provides the concentration and conductivity of the solution from blendpoint 350 in FIG. 1, more particularly, 14.8% w/w $NH_4F$ and 160 mS/cm. The operating curve shown in FIG. 2 is only valid for one unique ammonium fluoride source 300 assay. To obtain the buffered HF 400 having 14.8% wt. $NH_4F$ and 0.08% wt. HF from a HF 200 source and an ammonium fluoride source 300 of 40% $NH_4F$ by wt. and 0.000% free species, the blendpoint 250 is set to 3.300 mS/cm and the HF is added from source HF 200 until a conductivity of 3.300 mS/cm is reached at blendpoint 250. $NH_4F$ is then added from source $NH_4F$ 300 at blendpoint 350 to a conductivity of 160 mS/cm. If the ammonium fluoride source 300 changes, the 3.300 mS/cm setting at blendpoint 250 will no longer be valid to obtain the final required buffered HF 400 solution. A unique blendpoint 250 must be found for every ammonium fluoride source 300 assay as explained above.

Various techniques were tested to try to minimize or remove this ammonium fluoride assay dependence, including reversing the blend order to blend ammonium fluoride first followed by HF, all unsuccessfully, because there is no method of compensating for the varying assays of the $NH_4F$ source material using the blender arrangement of FIG. 1.

Figure 3:
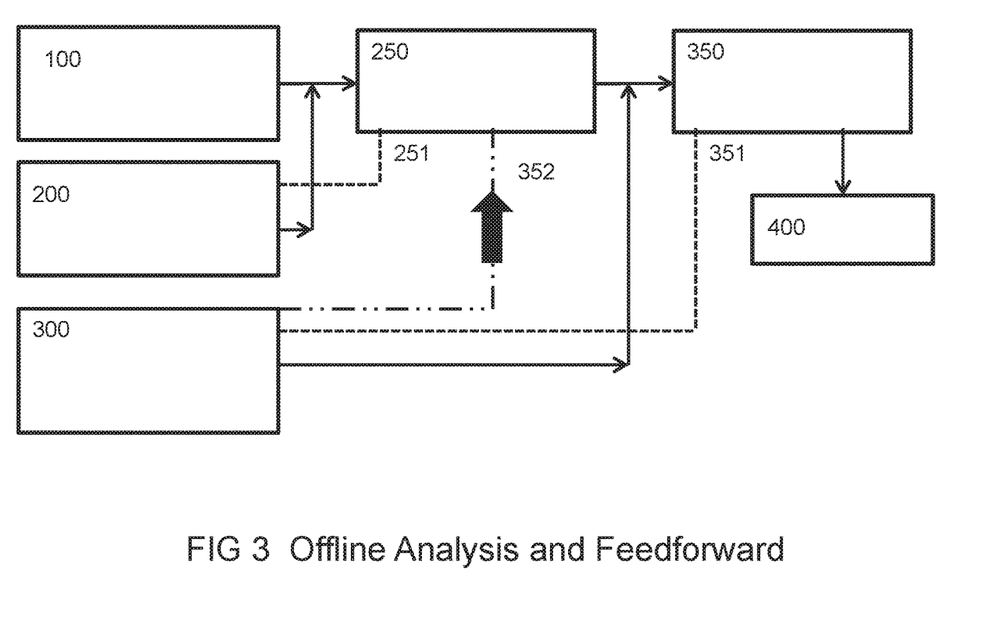
FIG. 3 is a block schematic diagram of an inline blender with a proposed offline chemical analysis feedforward step.

Based on the limitations of the prior art continuous inline blender of FIG. 1, a "Feedforward" step was proposed that includes the assay of the ammonium fluoride 300 and the amount of free species $NH_3$ or HF to alter the setpoint for HF source at the blendpoint 250 analysis. A block schematic of this proposal is shown in FIG. 3. An automated means (not shown) provides the concentration of free species and ammonium fluoride in the ammonium fluoride source 300 to blendpoint 250 as indicated by the feedforward step 352. The automated means must remain accurate for the $NH_4F$ assay as well as free species $NH_3$ or HF across a full domain of source 300 input possibilities, pH for example, vs. just one single value—the final disclosed blender setpoint. Based on mass balance information and calculations, the new setpoint 352 was sent to the blendpoint 250. Various automated metrology devices were explored to provide this automated solution, including conductivity, refractive index and pH. Due to mass balance offsets, convoluted intermediate steps with errors, and difficulty obtaining the true assay of the ammonium fluoride 300, not to mention the long time interval, consumables and equipment costs necessary to run such an automated analytical assay process, this proposal was rejected. Blendpoint 350 of FIGS. 2 and 3 must remain fixed because the final buffered oxide etch solution 400 assay must be fixed.

Figure 4:
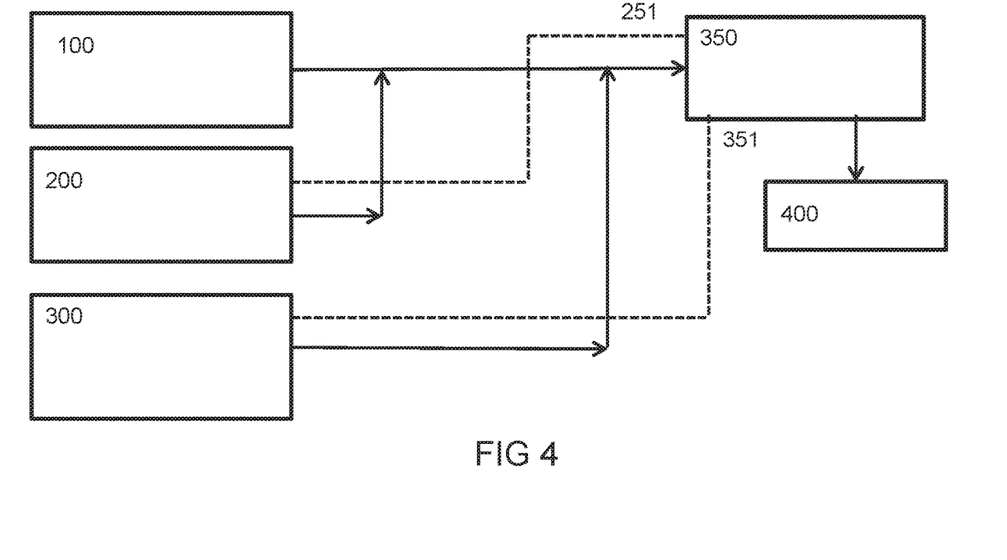
FIG. 4 is a block schematic diagram of the disclosed inline blender.

FIG. 4 is a block schematic of the inline blender that solves the problems that have not been resolved in the prior art. As will be described in more detail below, blendpoint 250 of FIGS. 1 and 3 has been eliminated and blendpoint

350 now provides temperature compensated pH feedback 251 to the proportioning valve (not shown) for HF 200 and temperature compensated conductivity feedback 351 to the proportioning valve (not shown) for the ammonium fluoride source 300.

Chemical equilibrium arises within a buffering salt and acid. As discussed above for the buffered oxide etch solution, using $NH_4F$ as the salt buffer results in the following chemical solution species:

$H_2O$ (I)
HF (aq)
$H^+$
$OH^-$
$NH_4^+$
$NH_3$
$F^-$

In FIG. 4, the $NH_4F$ salt is fully dissolved in the aqueous solution at $NH_4F$ source 300. The pH feedback 251 and conductivity feedback 351 must take place after complete mixing of UPW 100, HF 200, and $NH_4F$ 300 (i.e., completion of any chemical reaction, salt formation from $NH_3$ rich material, etc.) and establishment of a full chemical equilibrium for all the ion species.

At chemical equilibrium, an Initial, Change, Equilibrium ("ICE") matrix for the components to be reacted may be established to determine the sensor settings needed. Alternatively, for many cases, the shortcut Henderson-Haselbalch equation may be used (i.e., $pH = pK_a + \log_{10}([A-]/[HA])$, wherein $K_a$ is the acid dissociation constant, [HA] is the molar concentration of the un-dissociated weak acid, and [A-] is the molar concentration of the conjugate base of HA). One of ordinary skill in the art will recognize that the ICE matrix or Henderson-Haselbach equations are temperature dependent.

Figure 5:
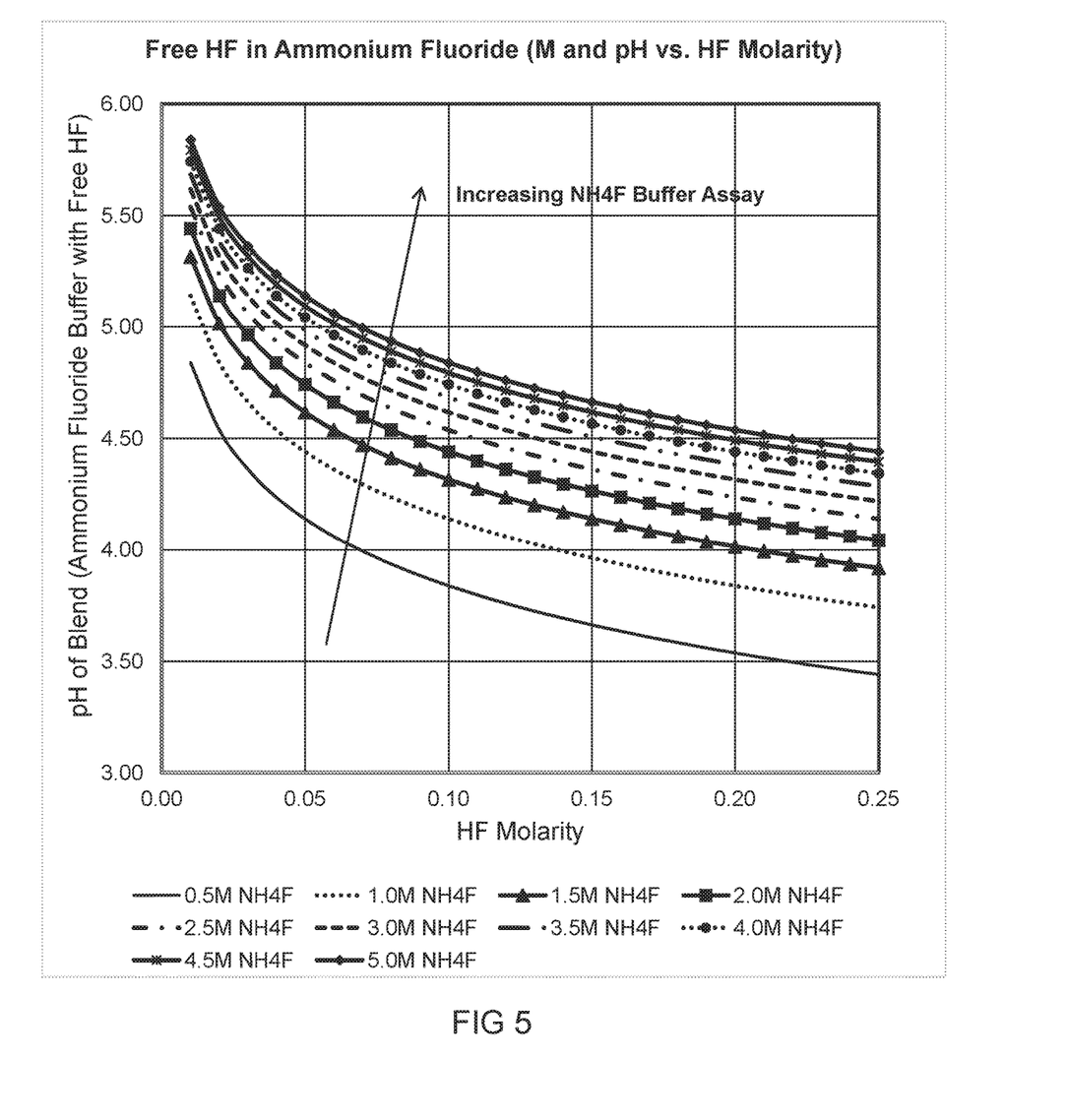
FIG. 5 is a graph showing pH versus HF concentration for different molarity $NH_4F$ solutions.

The resulting chemical operating curve is shown in FIG. 5, which is a graph showing pH of the blend versus HF molar concentration for different molarity $NH_4F$ solutions. The FIG. 5 graph shows a family of curves representing the molarity of the salt buffer $NH_4F$. 10 curves are shown for $NH_4F$ molarity ranging from 0.5 M to 5.0 M. The molarity of the $NH_4F$ buffer solution provides the desired conductivity reading. For example, the solid line represents 0.5 M $NH_4F$; the dotted line represents 1.0 M $NH_4F$; the triangled line represents 1.5 M $NH_4F$; the squared line represents 2.0 M $NH_4F$; the dot-dash line represents 2.5 M $NH_4F$; the dashed line represents 3.0 M $NH_4F$; the dot-dot-dash line represents 3.5 M $NH_4F$; the circled line represents 4.0 M $NH_4F$; the  line represents 4.5 M $NH_4F$; and the diamond line represents 5.0 M $NH_4F$. Data of concentration versus conductivity for various chemicals are published at 25° C. For each molarity of $NH_4F$ above, a specific temperature compensated conductivity is manifested. For highest accuracy in the disclosed blender, the actual temperature compensated conductivity at each salt buffer concentration is determined empirically.

Figure 6:
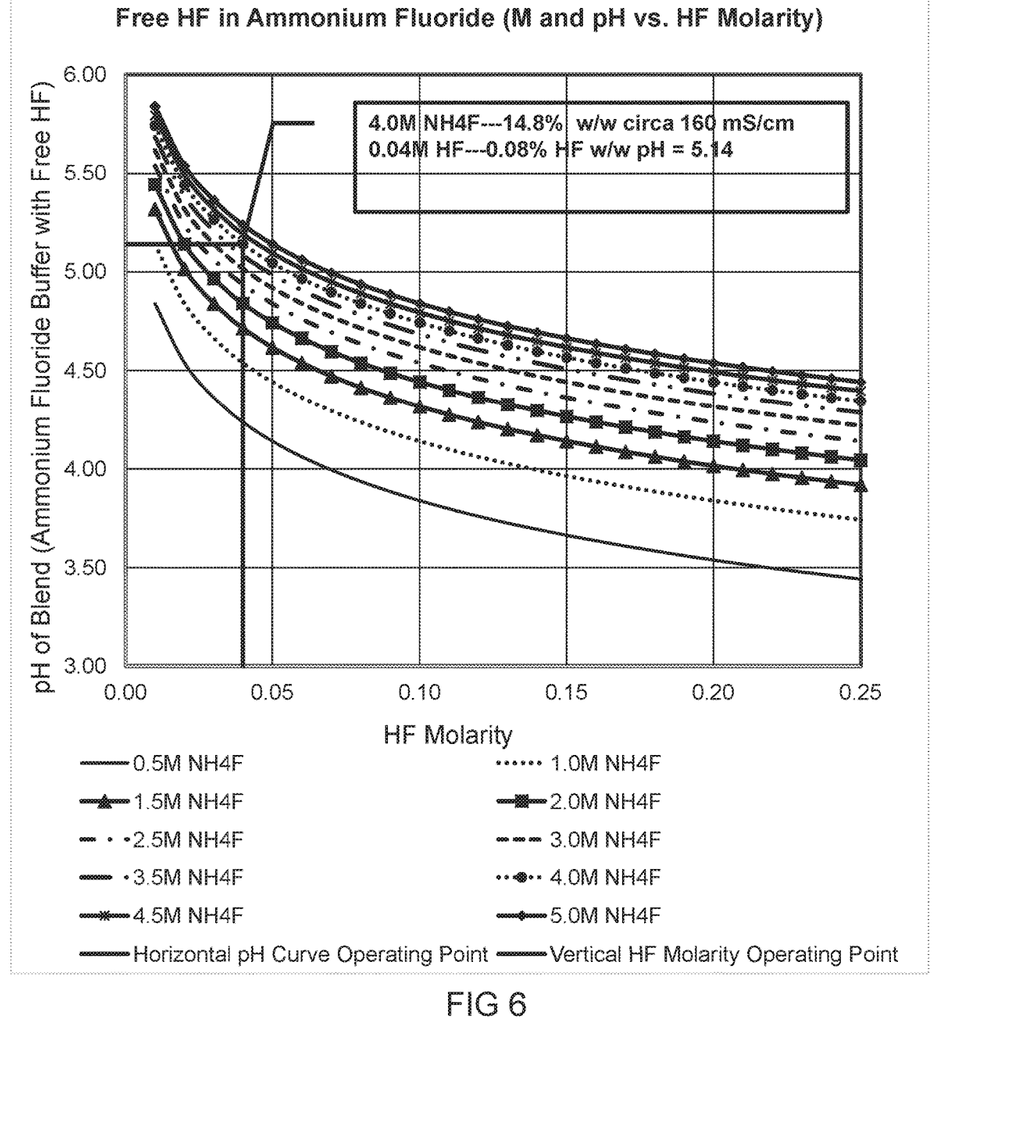
FIG. 6 is the graph demonstrating how to select the pH and conductivity set points necessary to produce the blend having the desired concentration, notwithstanding the assay of the source materials.

Each $NH_4F$ molarity curve intersects the pH and HF concentration axes at different points. As shown by the solid graph grid line at pH=4.5, a constant pH may be maintained with increasing HF concentration due to the buffering effect obtained by the increasing $NH_4F$ M. The desired concentration of the oxide etch buffer solution may be selected to determine the needed molarity/conductivity of the $NH_4F$ and pH of the resulting oxide etch buffer solution. For example, as shown in FIG. 6, if the desired blend contains 14.8% $NH_4F$ by wt. (4.00 M or 160.00 mS/cm) and 0.08000% HF by wt (0.04 M), the resulting pH is 5.1. The resulting setpoints for the blender sensors using this example are:

Temperature Compensated Conductivity 351=160.00 mS/cm
Temperature Compensated pH 251=5.1

Instead of a cascaded series of inline blend points used by the traditional continuous blender, just one blend point 350 may be used as the confluence of all the constituents, and feedback is established to obtain the setpoints from the operating curve shown in FIG. 5. As a result, the blender occupies a smaller footprint than the prior art multi-blend point inline blender and further may require less maintenance.

Experimentation in a full scale blender has demonstrated that using conventional proportional-integral-derivative (PID) feedback control, final blend output assay control is automatically, (via the disclosed PID feedback control), obtained/maintained, regardless of HF or $NH_4F$ source assays. The conventional PID feedback control system is an electronic closed-loop control between the flow meters, control valves (or pump control), and analyzers. The analyzer results are used to adjust the flow meters and/or control valves in order to maintain the final desired blend assay.

The $NH_4F$ Molarity/Concentration is automatically controlled with a "Reverse Acting", (SP-PV), traditional PID algorithm—as conductivity rises, $NH_4F$ flow drops via the PID algorithm.

The HF Molarity/Concentration is automatically controlled with a "Direct Acting", (PV-SP), traditional PID algorithm—as pH rises, HF flow increases via PID algorithm.

These two automatic PID feedback algorithms ensure the final blend output is at the temperature compensated conductivity and temperature compensated pH and therefore at the unique and required blend output assay.

When a new $NH_4F$ source is placed online, regardless of the $NH_4F$ assay or the amount of free $NH_3$ or HF, final blend assay is controlled by automatically via the PID feedback as explained above to maintain the desired conductivity and pH and thus the final stable and consistent $NH_4F$ and HF assay. The final blend does not change as a function of the origin of the free HF species—either in the HF source or the $NH_4F$ source as long as the six species alone are present, mixing is complete, chemical equilibrium is established, and process variables are temperature compensated as discussed previously. Nor does the bulk concentration of salt in the source $NH_4F$ effect the final blend assay, but instead simply by the flow of $NH_4F$ driven from the Reverse Acting PID algorithm.

The resulting solutions/slurries having the desired concentration may be prepared on-demand without worrying about any changes to the concentrations of the starting materials. More particularly, the disclosed methods produce solutions and slurries on demand that are able to maintain concentrations within 0.22% w/w of the desired concentration. Depending on the chemical and measuring technique, the concentration may be maintained within 0.008% w/w of the desired goal. As shown in the examples that follow, this is an improvement over the results obtained using the prior art blender of FIG. 1.

While tests to date have been performed using the buffered oxide etch solution (i.e., $NH_4F/HF/H_2O$), Applicants believe that the disclosed blending process may also be used for other solutions requiring high precision that are common in the electronics industry including, but not limited to, solutions such as $NH_4OH/H_2O_2/H_2O$, $HCl/H_2O_2/H_2O$, or $H_2SO_4/H_2O_2/H_2O$ or slurries containing abrasive particles, such as silica ($SiO_2$), alumina ($Al_2O_3$), calcium carbonate ($CaCO_3$), ceria ($CeO_2$), zirconia ($ZrO_2$), or titania (TiO2) in a basic solution such as $NH_4OH$/ammonium acetate/$H_2O$ or $NaHCO_3$/NaOH/$H_2O$ or an acidic solution such as $NH_4F$/HF/$H_2O$.

EXAMPLES

The following non-limiting examples are provided to further illustrate embodiments of the invention. However, the examples are not intended to be all inclusive and are not intended to limit the scope of the inventions described herein.

Disclosed Blender Example:

The inline blender of FIG. 4 was built in the research laboratory to determine whether the final concentration was maintained after changing $NH_4F$ source 300. Due to the research settings and waste management requirements, the concentrations in these examples are less than typically encountered in the industry.

The trial runs were performed with an Ultra Pure Water (UPW) flow rate of 1.75 liters per minute (Lpm) flowing from UPW source 100. A pH probe and conductivity probe for feedback elements 251 and 351 was added after blendpoint 350. A PTFE six stage static mixer purchased from Edlon Inc. was used for blendpoint 350.

Each Feedback Metrology Subsystem was tuned and optimized for this UPW flow rate for maximum stability/response. This was accomplished using the resident onboard Allen Bradley CompactLogix PLC Control and the Allen Bradley RSLogix programming suite using the PIDE (Proportional-Integral-Derivative Enhanced) Function Block.

The AutoTune feature of the PIDE Function Block was used to tune the PID parameters for optimum operation at the setpoints of Conductivity=50.00 mS/cm, pH=5.50. These AutoTune deduced PID parameters were rounded off and used for the Deterministic Blend Runs.

The following parameters were set:

| Parameter Description | Parameter Value | Units |
|---|---|---|
| UPW Blender Flow Rate | 1750 | mL/min |
| $NH_4F$ Conductivity Temperature Compensation Alpha | 0.0183 | $°C.^{-1}$ |
| pH Instrumentation Temperature Compensation | Endress and Hauser Auto Temp Compensation | No units |
| $NH_4F$ PIDE Feedback Parameters | | |
| PID Equation Type | Independent | No units |
| Control Action | Reverse Acting SP-PV | No units |
| Loop Update Time | 100 | Milliseconds |
| Deadband | 0.0 | |
| $K_p$ | 0.4 | unitless |
| $K_i$ | 3.6 | minutes$^{-1}$ |
| $K_d$ | 0.007 | minutes |
| HF PIDE Feedback Parameters | | |
| PID Equation Type | Independent | No units |
| Control Action | Direct Acting PV-SP | No units |
| Loop Update Time | 100 | milliseconds |
| Deadband | 0.0 | |
| $K_p$ | 20 | unitless |
| $K_i$ | 80.0 | minutes$^{-1}$ |
| $K_d$ | 0.4 | minutes |

To prepare for the experimental runs of the disclosed blender, three source containers of chemical were prepared:
1. Source 200 was 49% HF 2. Source 300 supply #1 contained 40% $NH_4F$ w/w and neutral free species, i.e. no free $NH_3$ or HF
3. Source 300 supply #2 contained 40% $NH_4F$ w/w and 0.9% free HF w/w The second HF rich source 300 was designed to challenge the system in comparison to the neutral free species source 300 supply #1 and for the system to throttle back the amount of HF delivered to the blend via source 200 and maintain the same final blend as more HF is delivered via source 300 supply #2. As a result, the concentrations of the first source 300 supply #1 will be considered the desired concentration.

At the end of this full scale blender test cycle, samples of the blender output were collected and retained and titrated for HF and $NH_4F$ assay with a Mettler Toledo Excellence T70 Titrator. External measurements of the conductivity and the pH were also measured in a beaker using:

Mettler Toledo InLab 717 Conductivity Probe Calibrated with a 12.9 mS/cm conductivity standard.
Mettler Toledo DG111-SC pH Probe
Calibrated using 5.00 and 8.00 pH standards.

The results of the two output blends from the disclosed blender FIG. 4 are shown in the table below: Both disclosed Deterministic Blend samples blended with source 200 HF 49% w/w.

| Sample Description | External Measured Conductivity (mS/cm) | External Measured pH | HF Assay (% w/w) | $NH_4F$ Assay (% w/w) |
|---|---|---|---|---|
| Source 300 Supply #1 40% $NH_4F$ w/w 0.00% free HF w/w 0.00% free $NH_3$ | 50.7494 | 5.278 | 0.1655 | 2.7030 |
| Source 300 Supply #2 40% $NH_4F$ w/w 0.90% free HF w/w 0.00% free $NH_3F$ | 50.8206 | 5.247 | 0.1675 | 2.6881 |
| Assay change (% w/w) | | | +0.0020 | −0.0149 |
| Accuracy = % Assay composition change = (Assay change/initial result) × 100 | | | 1.2% | 0.56% |

As can be seen, the system maintained the concentration of HF within +0.0020% w/w and $NH_4F$ within −0.0149% w/w in the final product notwithstanding the change of $NH_4F$ source 300. These results are well within the claimed concentration limits. Using the targeted temperature compensated pH and conductivity, a final product assay with small variations was achieved. In addition, these results were obtained on small volume samples, and do not benefit from the long term averaging that continuous dynamic blending provides. As a result, when implemented into a single blend point configuration and using two control loops for the different feeds, a much tighter control on the variation of the targeted pH and conductivity is expected. The tighter control on these critical control parameters will lead to a much tighter control on the final product assay notwithstanding variations in the feed product assay.

Prior Art Example:

In order to contrast the blend output result from the prior art blender of FIG. 1, a series blender with two blend points with conductivity feedback as in FIG. 2 was simulated. Blendpoint 250 was reproduced in a large beaker with dilute HF to a conductivity of 50 mS/cm as measured by the same external conductivity probe as in the example above, a Mettler Toledo InLab 717 Conductivity Probe. The sample was split into two small beakers. In one beaker, source 300 supply #1 was added to a conductivity of 50 mS/cm and in the other beaker, source 300 supply #2 was added to a conductivity of 50 mS/cm; this is the series operation of the prior art blender with conductivity feedback. The two beakers were then titrated with the same Mettler Toledo Excellence T70 Titrator as in the example above to obtain the HF assay. The conductivity and pH were measured with the Mettler Toledo InLab 717 Conductivity Probe and the Mettler Toledo DG111-SC pH Probe in the same way as was done in the example above.

The results of the two output blends from the prior art blender simulation of

FIG. 1 are shown in the table below:

| Sample Description | External Measured Conductivity (mS/cm) | External Measured pH | HF Assay (% w/w) | $NH_4F$ Assay (% w/w) |
|---|---|---|---|---|
| Source 300 Supply #1 40% $NH_4F$ w/w 0.00% free HF w/w 0.00% free $NH_3$ | 49.436 | 4.908 | 0.1751 | Not measured |
| Source 300 Supply #2 40% $NH_4F$ w/w 0.90% free HF w/w 0.00% free $NH_3F$ | 49.256 | 4.795 | 0.2661 | Not measured |
| Assay change (% w/w) | | | +0.0910 | N/A |
| Accuracy = % Assay composition change | | | +51.97% | N/A |

As can be seen, the HF assay alone is more than 10 times larger than the claimed target concentration window (i.e., ±0.008% w/w). As a result, the two exemplary blend output tables confirm the essence of the disclosed invention; that the Deterministic Blender can compensate for changes to $NH_4F$ source 300, where the prior art is blind and unable to adjust to the changing source 300 levels of free HF. Neither of these examples take advantage of the inherent benefits of dynamic blending, which generally leads to a tighter control on the targeted final blend control characteristics i.e., pH and conductivity. The disclosed processes simply provide a means of having the correct target for the conductivity and pH without concern for the feed assay.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

I claim:

1. A method of continuously mixing chemical fluids in an inline blender to produce a mixture having a concentration of the chemical fluids within 0.22% w/w of a target concentration, the method comprising:
   a) providing a HF, a NH4F and a H2O input, wherein the $NH_4F$ comprises free NH3 or HF, and wherein the H2O input is at a known and fixed flow rate,
   b) forming a mixture comprising HF, NH4F and H2O from the inputs of step a), wherein steps a) and b) are performed continuously to deliver a mixture suitable for use as a buffered oxide etch solution,
   c) only monitoring the mixture formed by step b) for a feedback control of one or more rates of input in the providing step a), wherein the monitoring step c) comprises measuring both a temperature compensated pH and a temperature compensated conductivity of the mixture formed in step b),
   d) comparing the temperature compensated pH and the temperature compensated conductivity to a chemical operating curve, the chemical operating curve representing a relationship of a pH of the mixture of step b) to a molar concentration of HF in the mixture, as a function of a molarity of the NH4F of the mixture of step b) determined from the temperature compensated conductivity,
   e) adjusting one or more rates of input of step a) based on the comparison in step d) to thereby maintain a concentration of HF and NH4F in the mixture of step b) to within 0.22% w/w of the target concentration of HF and NH4F.

2. The method of claim 1, wherein the $H_2O$ is ultra purified water.

3. The method of claim 1, further comprising:
   a) providing the HF into an inline blender via a first flow control device,
   b) providing the NH4F into the inline blender via a second flow control device,
   c) providing the H2O into the inline blender via a third flow control device;
   d) forming the mixture comprising HF, NH4F and H2O in a mixing zone of the inline blender,
   e) monitoring the mixture only downstream from the mixing zone for a HF concentration and a NH4F concentration; and
   f) adjusting the first flow control device based on the HF concentration or adjusting the second flow control device based on the NH4F concentration.

4. The method of claim 3, wherein each of the first flow control device, the second flow control device, and the third flow control device is an orifice, a flow control valve, a stepper throttle, or combinations thereof.

5. The method of claim 3, wherein the mixing zone is a tube or a pipe having an unrestricted flow path.

6. The method of claim 3, wherein the mixing zone comprises an element to induce mixing.

7. The method of claim 6, wherein the element to induce mixing is a static mixer, a stirrer, a vortex element, or combinations thereof.

8. The method of claim 3, wherein the HF concentration and the NH4F concentrations are monitored by a combination of a conductivity meter and a pH meter.

9. The method of claim 1, wherein the concentration of HF and NH4F in the mixture of step b) is maintained to within 0.10% w/w of the target concentration of HF and NH4F.

10. The method of claim 1, wherein the concentration of HF and NH4F in the mixture of step b) is maintained to within 0.01% w/w of the target concentration of HF and NH4F.

11. The method of claim 1, wherein the concentration of HF and NH4F in the mixture of step b) is maintained to within 0.001% w/w of the target concentration of HF and NH4F.

12. The method of claim 1, wherein the concentration of HF in the mixture of step b) is maintained to within 0.008% w/w of the target concentration of HF and the concentration of NH4F in the mixture of step b) is maintained to within 0.22% w/w of the target concentration of NH4F.

* * * * *